(12) United States Patent
Hanari et al.

(10) Patent No.: US 8,336,291 B2
(45) Date of Patent: Dec. 25, 2012

(54) EXHAUST THROTTLE VALVE DIAGNOSING DEVICE AND METHOD

(75) Inventors: Akira Hanari, Fujisawa (JP);
Kouichirou Yomogida, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 875 days.

(21) Appl. No.: 12/039,115

(22) Filed: Feb. 28, 2008

(65) Prior Publication Data

US 2008/0209887 A1    Sep. 4, 2008

(30) Foreign Application Priority Data

Mar. 2, 2007  (JP) ................................. 2007-053042

(51) Int. Cl.
*F01N 3/00* (2006.01)
(52) U.S. Cl. ............... 60/277; 60/274; 60/278; 60/280; 60/292; 60/295; 60/297; 60/311; 60/324
(58) Field of Classification Search .................. 60/274, 60/277, 284, 292, 295, 297, 324; 73/23.2, 73/23.21–23.24
See application file for complete search history.

(56) References Cited

U.S. PATENT DOCUMENTS

| | | | | |
|---|---|---|---|---|
| 4,271,667 A | * | 6/1981 | Mitsuda et al. | 60/276 |
| 6,381,952 B1 | * | 5/2002 | Asanuma et al. | 60/284 |
| 6,477,830 B2 | * | 11/2002 | Takakura et al. | 60/277 |
| 6,711,892 B2 | * | 3/2004 | Tamura et al. | 60/277 |
| 6,968,677 B2 | * | 11/2005 | Tamura | 60/277 |
| 7,210,289 B2 | * | 5/2007 | Sugano et al. | 60/324 |
| 2008/0034737 A1 | * | 2/2008 | Otsubo et al. | 60/292 |

FOREIGN PATENT DOCUMENTS

| | | |
|---|---|---|
| JP | 10-141069 | 5/1998 |
| JP | 11-148375 | 2/1999 |

\* cited by examiner

*Primary Examiner* — Thomas Denion
*Assistant Examiner* — Diem Tran
(74) *Attorney, Agent, or Firm* — McCormick, Paulding & Huber LLP (57) ABSTRACT

When switching an exhaust throttle valve from full opening to a closed position to warm up an engine, an intake throttle valve is fixed to full opening, an EGR valve is fixed to full closing, and a variable turbo-vane is fixed to a predetermined opening degree to accelerate a gas flow rate from an intake passage to an exhaust passage, a fully opened flow rate is detected and stored by gas flow rate detector, with the exhaust throttle valve being full opening. Then, an instruction is issued to the exhaust throttle valve to switch from the full opening to a closed position, after which a rotation number of the engine is detected, a threshold value is determined based thereon, a closed position flow rate is detected, a flow rate difference relative to the stored fully opened flow rate is determined, and failure of the exhaust throttle valve is judged based on whether the flow rate difference is less than the determined threshold value.

10 Claims, 3 Drawing Sheets

EXHAUST THROTTLE VALVE DIAGNOSING DEVICE AND METHOD

CROSS REFERENCE TO RELATED APPLICATION

This application claims priority to Japanese Patent Application No. 2007-53042 (filed Mar. 2, 2007), the details of which are incorporated herein by reference.

BACKGROUND OF THE INVENTION

1. Field of the Invention

The present invention relates to an exhaust throttle valve diagnosing device and method for diagnosing mechanical failure of an exhaust throttle valve provided in an exhaust passage of an engine.

2. Description of the Related Art

Exhaust throttle valves for throttling the exhaust of an exhaust passage are fitted to, for example, the diesel engines of large automotive vehicles (see, for example, Japanese Unexamined Patent Application No. H11-148375).

Such exhaust throttle valves are controlled to throttle the exhaust when, for example, engine warm-up and exhaust purifying filter device (DPD device) regeneration are implemented. More specifically, when a control computer of the engine judges that either a warm-up control (QWS) or a DPD regeneration control has been initiated on the basis of engine water temperature or revolutions and DPD regeneration permitting conditions, the exhaust throttle valve is closed to suppress the exhaust gas flow rate and, as a result, a rise in the exhaust temperature necessary for both accelerating engine warm-up and DPD regeneration is accelerated.

Conventional exhaust throttle valve failure diagnosis has involved the use of a solenoid valve for actuating the exhaust throttle valve, as well as a drive relay for driving the solenoid valve. For example, the control computer executes a circuit diagnosis of the solenoid valve or drive relay electrically connected to the control computer.

However, conventional failure diagnosis such as this has the inherent problem of facilitating only an electrical failure diagnosis and, accordingly, it does not allow for diagnosis of mechanical failure such as that due to close sticking or open sticking of the exhaust throttle valve due to soot or the like.

A concern inherent to an exhaust throttle valve sticking in this way is that it will cause imperfect engine warm-up, power capacity/exhaust gas deterioration due to exhaust resistance, imperfect DPD regeneration, as well as the misdiagnosis of other diagnoses that use air flow rate measurement resulting in erroneous failsafe indications.

Thereupon, the supplementary provision of an opening degree sensor (position sensor) in the exhaust throttle valve to implement a direct diagnosis thereof has been considered as a method for diagnosing the mechanical failure of an exhaust throttle valve.

However, because the exhaust throttle valve constitutes an exhaust system component part there are temperature and vibration-related problems, as well as a cost-related problem inherent thereto, and the supplementary provision of an opening degree sensor and so on thereon involves a mounting step that is difficult to implement. In addition, because the exhaust throttle valve requires no precise opening degree control and is basically ON/OFF controlled, mounting an opening degree sensor for the purpose of diagnosis alone is undesirable from the viewpoint of cost.

SUMMARY OF THE INVENTION

It is an object of the present invention to provide an exhaust throttle valve diagnosing device and method that, in resolving the aforementioned problems, facilitates a simple detection of the mechanical failure of an exhaust throttle valve caused by sticking or the like.

One mode of the present invention designed to attain the aforementioned object constitutes an exhaust throttle valve diagnosing device for diagnosing mechanical failure of an exhaust throttle valve, which is provided with an intake throttle valve provided in an intake passage of an engine, the intake passage communicating with an exhaust passage of the aforementioned engine through a recirculation passage of an exhaust recirculation device, and which is provided with a recirculation valve provided in the recirculation passage, and a turbocharger turbine having a variable turbo-vane and a normally fully opened exhaust throttle valve switchable to a predetermined close position provided in the aforementioned exhaust passage downstream of the recirculation passage comprising: gas flow rate detection means for detecting the flow rate of a gas flowing through the aforementioned intake passage or exhaust passage; storage means for storing the flow rate detected by gas flow rate detection means: and failure judgment means for, when switching the aforementioned exhaust throttle valve from full opening to the aforementioned closed position in order to warm up the aforementioned engine, fixing the aforementioned intake throttle valve to full opening, fixing the aforementioned recirculation valve to full closing and fixing the aforementioned variable turbo-vane to a predetermined opening degree so as to accelerate a gas flow rate from the aforementioned intake passage to the exhaust passage, detecting a fully opened flow rate by the aforementioned gas flow rate detection means, with the aforementioned exhaust throttle valve fully opened, and storing this flow rate in the aforementioned storage means, and then instructing the aforementioned exhaust throttle valve to switch from full opening to the aforementioned closed position for detecting a closed position flow rate by aforementioned gas flow rate detection means, determining a flow rate difference by deducting the detected closed position flow rate from a fully opened flow rate stored in the aforementioned storage means, and judging a failure of the aforementioned exhaust throttle valve when this flow rate difference is less than a predetermined judgment threshold value.

Another mode of the present invention designed to attain the aforementioned object constitutes an exhaust throttle valve diagnosing device for diagnosing mechanical failure of an exhaust throttle valve, which is provided with an intake throttle valve provided in an intake passage of an engine, the intake passage communicating with an exhaust passage of the aforementioned engine through a recirculation passage of an exhaust recirculation device, and which is provided with a recirculation valve provided in the recirculation passage, and a turbocharger turbine having a variable turbo-vane, an exhaust purifying filter device for collecting exhaust particulates and a normally fully opened exhaust throttle valve switchable to a predetermined close position provided in the aforementioned exhaust passage downstream of the recirculation passage comprising: gas flow rate detection means for detecting the flow rate of a gas flowing through the aforementioned intake passage or exhaust passage; storage means for storing the flow rate detected by gas flow rate detection means: and failure judgment means for, upon switching the aforementioned exhaust throttle valve from full opening to the aforementioned closed position in order to regenerate the aforementioned exhaust purifying filter device, fixing the aforementioned intake throttle valve to full opening, fixing the aforementioned recirculation valve to full closing and fixing the aforementioned variable turbo-vane to a predetermined opening degree so as to accelerate a gas flow rate from the aforementioned intake passage to the exhaust passage, detecting a fully opened flow rate by the aforementioned gas flow rate detection means, with the aforementioned exhaust throttle valve fully opened, and storing this flow rate in the aforementioned storage means, and then instructing the aforementioned exhaust throttle valve to switch from full opening to the aforementioned closed position for detecting a closed position flow rate by aforementioned gas flow rate detection means, determining a flow rate difference by deducting the detected closed position flow rate from a fully opened flow rate stored in the aforementioned storage means, and judging a failure of the aforementioned exhaust throttle valve when this flow rate difference is less than a predetermined judgment threshold value.

Gas flow rate detection means is preferably configured from an intake air quantity sensor provided in the intake passage upstream from the intake throttle.

The predetermined opening degree of the variable turbo-vane is preferably not more than 10%.

The flow rate difference is preferably corrected in accordance with the atmospheric pressure, intake air temperature, and engine water temperature.

Another mode of the present invention designed to attain the aforementioned object constitutes an exhaust throttle valve diagnosing method for diagnosing mechanical failure of an exhaust throttle valve, which is provided with an intake throttle valve provided in an intake passage of an engine, the intake passage communicating with an exhaust passage of the aforementioned engine through a recirculation passage of an exhaust recirculation device, and which is provided with a recirculation valve provided in the recirculation passage, and a turbocharger turbine having a variable turbo-vane and a normally fully opened exhaust throttle valve switchable to a predetermined close position provided in the aforementioned exhaust passage downstream of the recirculation passage, the method comprising the steps of: when switching the aforementioned exhaust throttle valve from full opening to the aforementioned closed position to warm up the aforementioned engine, fixing the aforementioned intake throttle valve to full opening, fixing the aforementioned recirculation valve to full closing and fixing the aforementioned variable turbo-vane to a predetermined opening degree so as to accelerate a gas flow rate from the aforementioned intake passage to the exhaust passage; and detecting a fully opened flow rate gas flow in the intake throttle valve or the exhaust throttle valve, with the exhaust throttle valve at full opening, and storing this fully opened flow rate, and then instructing the aforementioned exhaust throttle valve to switch from full opening to the aforementioned closed position for detecting a closed position flow rate, determining a flow rate difference by deducting the detected closed position flow rate from a fully opened flow rate that is stored, and judging a failure of the aforementioned exhaust throttle valve when this flow rate difference is less than a predetermined judgment threshold value.

Another mode of the present invention designed to attain the aforementioned object constitutes an exhaust throttle valve diagnosing method for diagnosing mechanical failure of an exhaust throttle valve, which is provided with an intake throttle valve provided in an intake passage of an engine, the intake passage communicating with an exhaust passage of the aforementioned engine through a recirculation passage of an exhaust recirculation device, and which is provided with a recirculation valve provided in the recirculation passage, and a turbocharger turbine having a variable turbo-vane, an exhaust purifying filter device for collecting exhaust particulates and a normally fully opened exhaust throttle valve switchable to a predetermined close position provided in the aforementioned exhaust passage downstream of the recirculation passage comprising the steps of: upon switching the aforementioned exhaust throttle valve from full opening to the aforementioned closed position in order to regenerate the aforementioned exhaust purifying filter device, fixing the aforementioned intake throttle valve to full opening, fixing the aforementioned recirculation valve to full closing and fixing the aforementioned variable turbo-vane to a predetermined opening degree so as to accelerate a gas flow rate from the aforementioned intake passage to the exhaust passage; and detecting a fully opened flow rate gas flow in the intake throttle valve or the exhaust throttle valve, with the exhaust throttle valve at full opening, and storing this fully opened flow rate, and then instructing the aforementioned exhaust throttle valve to switch from full opening to the aforementioned closed position for detecting a closed position flow rate, determining a flow rate difference by deducting the detected closed position flow rate from a fully opened flow rate that is stored, and judging a failure of the aforementioned exhaust throttle valve when this flow rate difference is less than a predetermined judgment threshold value.

DESCRIPTION OF THE PREFERRED EMBODIMENTS

The "exhaust throttle valve diagnosing device and method" described by the specification, claims and drawings of this application is described in Japanese Patent Application No. 2007-53042.

A preferred embodiment of the present invention will be hereinafter described with reference to the attached drawings.

The exhaust throttle valve diagnosing device (hereinafter the diagnosing device) of this embodiment has application in, for example, an automotive vehicle diesel engine.

The general structure of an engine in which the diagnosing device of this embodiment has application will be described with reference to FIG. 1.

Figure 1:
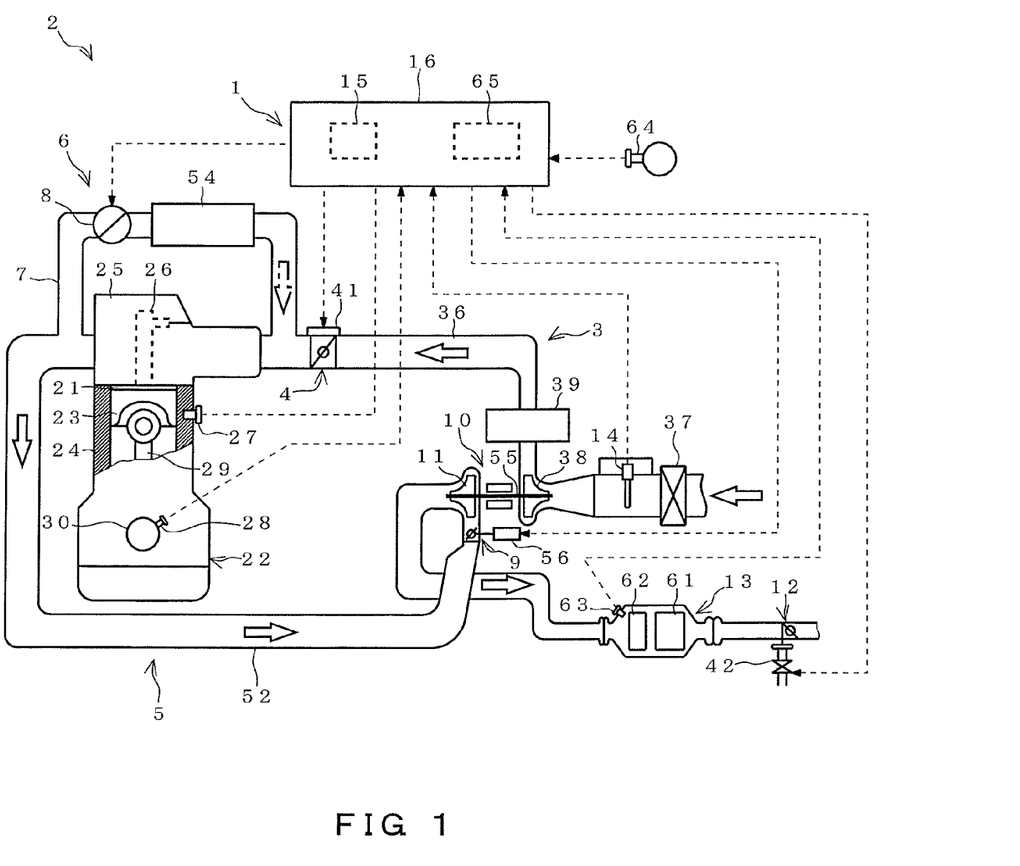
FIG. 1 is a schematic diagram of an engine in which one embodiment of an exhaust throttle valve diagnosing device pertaining to the present invention has application.

As shown in FIG. 1, an engine 2 comprises an engine main body 22 in which a combustion chamber 21 is formed, an intake passage 3 for supplying intake air (air) to the engine main body 22, an exhaust passage 5 for discharging exhaust gas from the engine main body 22, a turbocharger 10 for pressurizing the intake air to the engine main body 22, an exhaust recirculation device (hereinafter referred to as an EGR device) 6 for recirculating part of the exhaust gas into the intake air, an exhaust purifying filter device (hereinafter referred to as a DPD device) 13 for collecting exhaust particulates, and a control computer 16 for controlling the engine 2.

The engine main body 22 comprises a piston 23, a cylinder block 24 and a cylinder head 25 that demarcate the combustion chamber 21, and an injector 26 for injecting and supplying fuel to the combustion chamber 21.

A water temperature sensor 27 for detecting cooling water temperature and an engine revolution number sensor 28 for detecting the revolution number of the engine 2 are provided in the engine main body 22. As shown in the diagram, the water temperature sensor 27 is mounted on a water jacket (not shown in the drawing) formed in the cylinder block 24, and the engine revolution sensor 28 is mounted on a crankshaft 30 coupled to the piston 23 by way of a connecting rod 29.

The intake passage 3 is configured from an intake port of a cylinder head 25 that communicates with the combustion chamber 21 and an intake manifold (not shown in the drawing) connected to this intake port, and an intake air pipe 36 connected to this intake manifold. An air cleaner 37, a MAF sensor (mass flow rate temperature sensor) 14 serving as an intake air quantity sensor and an intake air temperature sensor (not shown in the drawing), a later-described compressor 38 of the turbocharger 10, an intercooler 39 and an intake throttle valve 4 for throttling the intake air are respectively provided in this order from the upstream side of the intake pipe 36.

The intake throttle valve 4 comprises an actuator 41 and an opening degree sensor (not shown in the diagram). The actuator 41 and opening degree sensor are controlled by the control computer 16, the opening degree of the intake throttle valve 4 being continuously controlled by the control computer 16.

The exhaust passage 5 is configured from an exhaust port of the cylinder head 25 that communicates with the combustion chamber 21 and an exhaust manifold (not shown in the diagram) connected to this exhaust port, and an exhaust pipe 52 connected to this exhaust manifold. A later-described turbine 11 of the turbocharger 10, the DPD device 13 and the exhaust throttle valve 12 for throttling the exhaust air are provided in the exhaust pipe 52 in this order from the upstream side.

The exhaust throttle valve 12 constitutes a normally opened butterfly valve or the like switchable to a predetermined closed position (for example, substantially fully closed) that comprises an actuator 42 for switching the butterfly valve between a full opening and the predetermined closed position. As the actuator 42, a fluid pressure actuator or the like with a diaphragm may be used. The actuator 42 is connected to the control computer 16, the exhaust throttle valve 12 being open/close controlled by the control computer 16.

In addition, the exhaust throttle valve 12 serves as an exhaust brake device and is moved into the predetermined closed position to impart a braking force when the exhaust brake is actuated such as when the vehicle is being decelerated.

The EGR device 6 comprises a recirculation passage (hereinafter referred to as an EGR pipe) 7 that communicates between the intake air pipe 36 and the exhaust pipe 52, a recirculation valve (hereinafter referred to as an EGR valve) 8 provided in the EGR pipe 7 for regulating the flow rate of the EGR pipe 7, and an EGR cooler 54 for cooling the EGR gas flowing through the EGR pipe 7.

An upstream end of the EGR pipe 7 is connected to the exhaust pipe 52 upstream side of the turbine 11, and a downstream end thereof is connected to the intake air pipe 36 downstream of the intake throttle valve 4.

The EGR valve 8 comprises an actuator and an opening degree sensor (not shown in the diagram). This actuator and opening degree sensor are each connected to the control computer 16, the opening of the EGR valve 8 being continuously controlled by the control computer 16.

For example, the opening degree of both the EGR valve 8 and the intake throttle valve 4 is controlled by the control computer 16 on the basis of a target EGR rate determined from the engine 2 running state.

The turbocharger 10 comprises the compressor 38 interposed in the intake air pipe 36 for pressurizing the intake air, the turbine 11 interposed in the exhaust pipe 52 and rotationally-driven by the exhaust, and a turbo shaft 55 for coupling the turbine 11 and the compressor 38 to transmit the power of the turbine 11 to the compressor 38.

The turbine 11 of this embodiment constitutes a variable nozzle turbine (VNT), this turbine 11 comprising a variable turbine vane (hereinafter referred to as a VNT vane) 9 provided in an inflow portion of the turbine 11 for controlling the supercharged pressure by varying the nozzle area, a vane actuator 56 for driving the VNT vane 9, and a vane opening degree sensor (not shown in the diagram).

The vane actuator 56 and vane opening degree sensor are connected to the control computer 16, the opening degree of the VNT vane 9 being continuously controlled by the control computer 16.

The DPD device 13 comprises a filter main body 61 interposed in the exhaust passage 5 for collecting particulates, an oxidizing catalyst 62 disposed upstream of the filter main body 61, and an exhaust temperature sensor 63 for detecting the exhaust gas temperature of the exhaust passage 5 (the DPD device 13).

In the DPD device 13 of this embodiment, the oxidizing catalyst 62 is activated by a DPD regeneration control executed by the control computer 16 to raise the exhaust gas temperature and, as a result, the particulates accumulated on the filter main body 61 are oxidized and the filter main body 61 is regenerated.

Examples of the DPD regeneration control include fuel injection timing delay and post-injection implemented subsequent to a main injection, the exhaust throttle valve 12 being controlled to the aforementioned predetermined closed position when this regeneration control is executed in order to increase the exhaust gas temperature.

The control computer 16 is connected to a plurality of sensors including the aforementioned engine revolution number sensor 28, the water temperature sensor 27, the MAF sensor 14, an intake air temperature sensor (not shown in the diagram), the exhaust temperature sensor 63, a vehicle speed sensor 64 for detecting vehicle speed, and an atmospheric pressure sensor 65 provided in the control computer 16 the control computer 16 receives the detected values from these sensors.

The control computer 16 is connected to a plurality of actuators including the aforementioned injector 26, the actuator 41 of the intake throttle valve 4, an actuator (not shown in the diagram) of the EGR valve 8, the vane actuator 56 of the turbocharger 10 and the actuator 42 of the exhaust throttle valve 12 and outputs a control signal to these actuators.

Basically, the control computer 16 executes a control that switches the normally fully opened exhaust throttle valve 12 to a predetermined closed position when exhaust brake actuation, engine warm-up operation and DPD regeneration are implemented.

A diagnosing device 1 for diagnosing mechanical failure caused by sticking or the like of the exhaust throttle valve 12 is provided in the engine 2.

The diagnosing device 1 of this embodiment comprises the aforementioned MAF sensor 14 that serves as gas flow rate detection means, a memory (storage means) 15 for storing the flow rate detected by the MAF sensor 14, and failure judgment means for determining the flow rate difference between the fully opened flow rate and closed position flow rate of the exhaust throttle valve 12 to judge sticking and failure of the exhaust throttle valve 12.

In this embodiment, the aforementioned control computer 16 serves as failure judgment means, the aforementioned memory 15 being provided in the control computer 16. Software and tables and so on used by the control computer 16 to execute the various controls are stored in the memory 15. In addition, the control computer 16 comprises an integrating timer (not shown in drawings) for measuring time.

In a more detailed description thereof, the control computer 16, upon switching the exhaust throttle valve 12 from full opening to the aforementioned closed position in order to warm-up the engine 2, fixes the aforementioned intake throttle valve 4 to full opening, fixes the EGR valve 8 to full closing and fixes the aforementioned VNT vane 9 to a predetermined opening degree to accelerate the rate of gas flow from the aforementioned intake passage 3 to the aforementioned exhaust passage 5, detects a fully opened flow rate via the MAF sensor 14 with the aforementioned exhaust throttle valve 12 at full opening and stores this flow rate in the aforementioned memory 15, and then instructs the actuator 42 of the aforementioned exhaust throttle valve 12 to switch from full opening to the aforementioned closed position for detection of a closed position flow rate via the MAF sensor 14, determines a flow rate difference by deducting the detected closed position flow rate from a fully opened flow rate stored in the memory 15, and judges a failure of the aforementioned exhaust throttle valve 12 when this flow rate difference is less than a predetermined judgment threshold value.

Here, the opening degree of the VNT vane 9 is preferably almost at full opening, or more specifically, no more than 10%. A 0% opening degree of the VNT vane 9 denotes full opening, and a 100% opening degree denotes full closing.

In addition, the control computer 16 corrects the aforementioned flow rate difference on the basis of the atmospheric pressure detected by the atmospheric pressure sensor 65, the intake air temperature detected by the intake air temperature sensor, and the engine water temperature detected by the water temperature sensor 27.

The exhaust throttle valve diagnosis method (hereinafter referred to as the diagnosis method) based on the diagnosing device 1 of this embodiment will be hereinafter described.

The diagnosis method of this embodiment involves an indirect diagnosis of mechanical failure of the exhaust throttle valve 12, the mechanical failure being diagnosed by detection of the flow rates with the exhaust throttle valve 12 at full opening and in the aforementioned predetermined closed position, and determination of the flow rate difference therebetween.

The timing of the implementation of this diagnosis can be either while an exhaust throttle valve 12 is being forcibly actuated unrelated to a normally executed diagnosis control, or when a normally controlled exhaust throttle valve 12 is switched from full opening to the closed position.

Of these, if the diagnosis is implemented with the exhaust throttle valve 12 being forcibly actuated, the exhaust throttle valve 12 will be actuated to either full opening or to the closed position when this is essentially unnecessary, the effect of which will be markedly apparent in the behavior of the engine 2 (vehicle).

With this in mind, in this embodiment the diagnosis is implemented at a timing at which the exhaust throttle valve 12 is switchingly-operated from full opening to the closed position.

Examples of timings at which the exhaust throttle valve 12 is switchingly-operated include when a moving vehicle is being decelerated (when an exhaust brake control is executed), and when a warm-up control (QWS control) and a DPD regeneration control are executed.

Here, as will be described in detail later, the opening degree of the intake throttle valve 4, the EGR valve 8 and the VNT vane 9 is fixed when the diagnosis is implemented.

Because the movement of other devices such as the intake throttle valve 4 is fixedly-controlled in this way, there is a concern that a diagnosis implemented while a vehicle is being decelerated will affect the exhaust brake implementation.

Thereupon, in this embodiment, the diagnosis is implemented when a warm-up control is initiated with the vehicle stationary and idling. In another later-described embodiment, the diagnosis is implemented when a DPD regeneration control is initiated with the vehicle stationary.

More specifically, an aforementioned software-based exclusive test mode for effecting a switching operation of the exhaust throttle valve 12 from the full opening to the closed position is provided, the exclusive test mode being additional to the software executed by the control computer 16.

The diagnosis method of this embodiment involves determination of a difference (deviation) between an air flow rate (substantially equivalent to the exhaust gas flow rate) calculated from the output value of the MAF sensor 14 with the exhaust throttle valve fully opened and an air flow rate calculated from the output value of the MAF sensor 14 when the exhaust throttle valve is at the fully closed position, and a judgment that mechanical failure and an abnormality or the like due to sticking or the like has occurred in the exhaust throttle valve 12 when the flow rate difference is less than a predetermined judgment threshold value which uses engine revolution number as a parameter (for example, when there is no change in the air flow rate between the fully open and closed position).

With this in mind, mechanical failure of the exhaust throttle valve 12 can be easily diagnosed without need for an opening degree sensor to be mounted thereon.

A characterizing feature of the diagnosis method pertaining to this embodiment lies in the execution of a control to increase the accuracy of the air flow rate measurement when the aforementioned test mode is initiated that involves the opening degree of the intake throttle valve 4 being fixed, the opening degree of the VNT vane 9 being fixed and the opening degree of the EGR valve 8 being fixed to eliminate dispersion between the flow rates of the intake passage 3 and the exhaust gas passage 5. More specifically, the intake throttle valve 4 is fixed to full opening, the EGR valve 8 is fixed to full closing, and the VNT vane 9 is fixed to a predetermined opening degree to accelerate the gas flow rate from the aforementioned intake passage 3 to the exhaust gas passage 5.

Because this eliminates dispersion between the fully opened flow rate and the closed position flow rate of the exhaust throttle valve 12 and, in turn, the fully opened flow rate detected by the MAF sensor 14 increases, the flow rate difference between the fully opened flow rate and the closed position flow rate increases and the diagnosis can be implemented more reliably and with greater precision.

In addition, while this failure diagnosis involves a comparison of the flow rate difference and a judgment threshold value, the judgment threshold value is set using the air flow rate (exhaust gas flow rate) during idling when the flow rate as a reference. Thereupon, test mode executing conditions (A), (B), (1) to (13) indicated below for judging whether or not a diagnosis will be implemented are established in such a way that ensures the diagnosis is implemented during idling and, by provision of these restrictions to the implementation of a diagnosis, diagnosis when the dispersion in air flow rates is large is prohibited.

Figure 2:
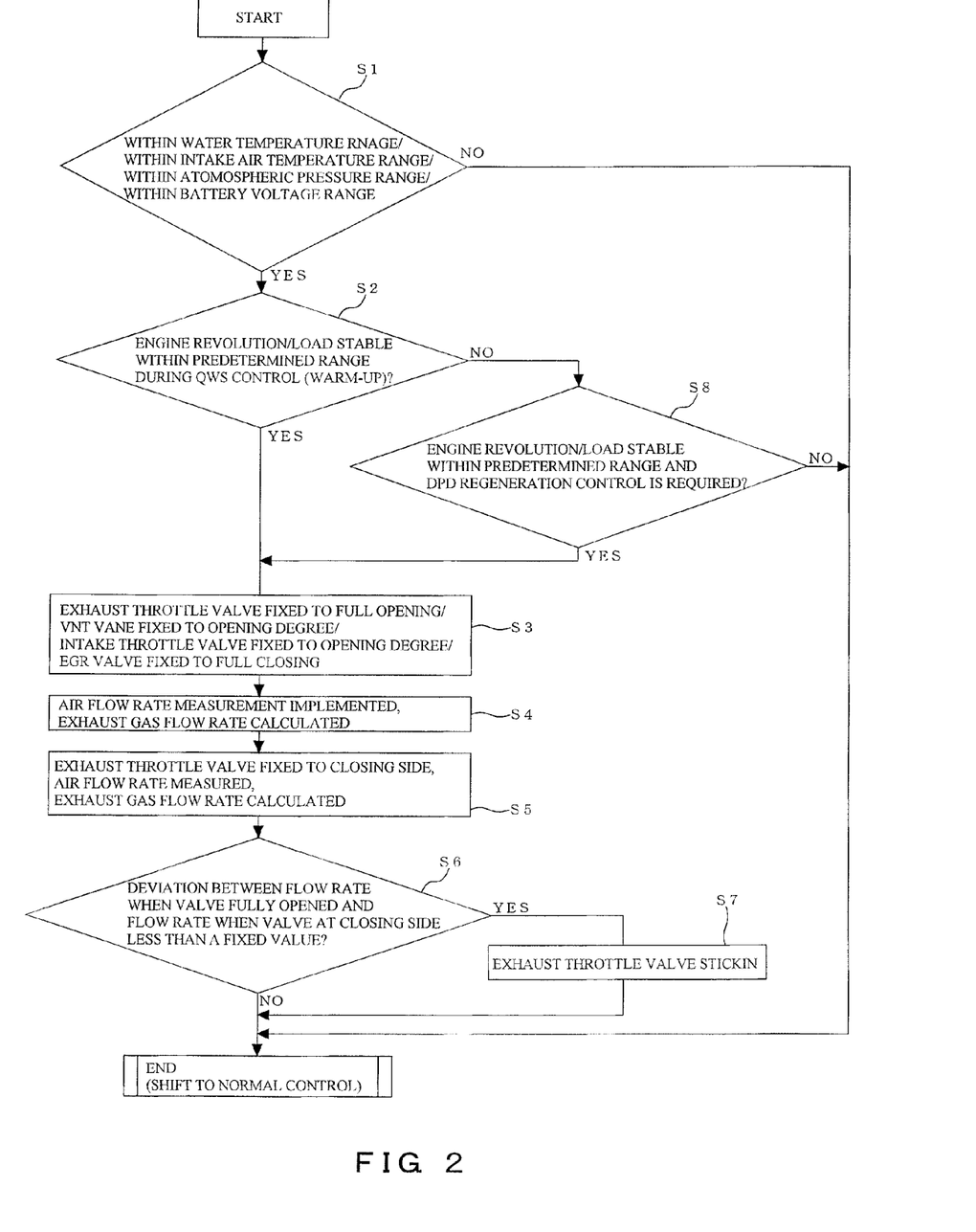
FIG. 2 shows the flow of one example of an exhaust throttle valve diagnosing method of this embodiment.

An example of a flow based on the diagnosis method of this embodiment will be hereinafter described with reference to FIG. 2. The flow of FIG. 2 is executed by the control computer 16 when the vehicle is stationary. In addition, the exhaust throttle valve 12 of the diagram for regenerating the DPD device 13 has combined use as an exhaust brake device and an exhaust throttling device for warm-up control and, accordingly, in reality only the exhaust throttle valve 12 is operated. The flow of FIG. 2 is not executed when the vehicle is in motion.

First, when a command to close the exhaust throttle valve 12 has been received, the control computer 16 evaluates whether or not in Steps S1 and S2 the command to close the exhaust throttle valve 12 is based on a warm-up control, whether or not the vehicle is stopped, and whether or not the running state of the engine 2 is stable.

More specifically, the control computer 16 evaluates and confirms whether or the following test mode executing conditions (A), (B), (1) to (13) have been established.

Test Mode Executing Conditions:

(A) PTO (power take-off) control is not being executed.

(B) Engine revolution number is stable. For example, the engine revolution sensor 28 pre-rotation value−current rotation value|deviation is no more than 100 rpm ($\leq$100 rpm).

(1) Engine revolution number condition: Detected value of engine revolution sensor 28 is 600 to 1000 rpm (possesses hysteresis). When this engine revolution number condition is satisfied, the engine 2 is idling.

(2) Injection quantity condition: Fuel injection quantity of injector 26 is 5 to 55 mm$^3$/st (possesses hysteresis). When this injection quantity condition is satisfied, the engine load is light.

(3) Water temperature condition: Detected value of water temperature sensor 27 is −9° C. to 92° C. (possesses hysteresis). When this water temperature condition is satisfied, the cooling water temperature of the engine 2 is within a predetermined water temperature range. This water temperature condition (3) prohibits diagnosis from being implemented both when the cooling water temperature is low and when it is high.

(4) Intake air condition: Detected value of intake air temperature sensor is −7° C. to 119° C. (possesses hysteresis). When this intake air temperature condition (4) is satisfied, the intake air temperature is not more than a predetermined intake air temperature range. The intake air condition high temperature-side value (119° C.) approximates real invalidation.

(5) Atmospheric pressure condition: Detected value of the atmospheric pressure sensor 65 is not less than 75 kPa (possesses hysteresis). This atmospheric pressure condition satisfies roughly all regions except high regions.

(6) Subsequent to the ignition key being switched ON, an exhaust brake valve diagnosis will not be implemented. This condition (6) condition ensures that if a diagnosis has been completed once with the engine running after the ignition key has been switched ON, the diagnosis in question will not be not be implemented when the engine 2 is restarted after the ignition key has been switched OFF until the ignition key is switched ON.

(7) Battery voltage is normal. For example, the battery voltage is 10 to 16V.

(8) Intake throttle: Detected opening degree of the opening degree sensor of the intake throttle valve 4 is open more than 50%. Diagnosis is prohibited if this condition (8) is not satisfied, for example, when the intake throttle valve 4 cannot be fully opened due to some kind of failure. A 0% opening degree of the intake throttle 9 denotes full opening, and a 100% opening degree denotes full closing.

(9) VNT vane 9 is normally controlled. Diagnosis is prohibited if this condition (9) is not satisfied, in other words, if the VNT vane 9 cannot be controlled due to some kind of failure.

(10) Accelerator opening degree: Accelerator is not depressed. More specifically, the depressed amount detected by the accelerator opening degree sensor (not shown in the diagram) is less than 3% (possesses hysteresis).

(11) Vehicle speed: Vehicle is stationary. More specifically, the vehicle speed detected by the vehicle speed sensor 64 is less than 2 km/h (possesses hysteresis).

(12) Warm-up control command is ON.

(13) DPD regeneration control command is OFF.

When these test mode executing conditions (A), (B), (1) to (13) are established and, as a result, it has been established that diagnosis is permitted, the control computer 16 executes a test mode.

That is to say, in Step S3, the control computer 16 fixes the intake throttle valve 4 to full opening, fixes the EGR valve 8 to full closing, and fixes the VNT valve 9 to a predetermined opening degree with the exhaust throttle valve 12 set to full opening.

In Step S4, the control computer 16 detects the intake air quantity when the exhaust throttle valve 12 is fully open (hereinafter referred to as the fully opened flow rate) via the MAF sensor 14.

Next, in Step S5, the control computer 16, with the intake throttle valve 4 fixed to full opening, the EGR valve 8 fixed to full closing and the VNT valve 9 fixed to a predetermined opening degree, instructs the actuator 42 of the exhaust throttle valve 12 to switch from full opening to the aforementioned predetermined closed position for detection of the intake air quantity by the MAF sensor 14 when the exhaust throttle valve 12 is in the closed position (hereinafter referred to as the closed position flow rate).

The test mode is completed subsequent to Step S3 to Step S5 described above being implemented. In Step S6 and Step S7, the control computer 16 executes a diagnosis of the exhaust throttle valve 12 on the basis of the fully opened flow rate and the closed position flow rate obtained in this test mode.

That is to say, in Step S6, the control computer 16 judges whether or not a flow rate difference obtained by deducting the closed position flow rate from the fully opened flow rate is less than a predetermined judgment threshold value.

More specifically, when the test mode is completed (Step S5), the control computer 16 judges and confirms that the following judgment permitting conditions (C) to (F) have been established, and then executes a failure judgment of the exhaust throttle valve 12 (sticking judgment).

Judgment permitting conditions:

(C) Test mode completed.

(D) Injection pump mode normal.

(E) Predetermined time since ignition key switched ON has elapsed.

(F) Battery voltage normal.

While the judgment permitting conditions (C) to (F) noted above exist in this embodiment, there are no particular limitations thereto and, for example, all or some of the judgment permitting conditions (D) to (F) may be omitted. Provided the test mode has been completed, a judgment can still be executed if the judgment permitting conditions (D) to (F) have been omitted.

When all of these judgment permitting conditions (C) to (F) have been established in Step S6, the control computer 16 executes a failure judgment of the exhaust throttle valve 12.

First, the control computer 16 determines the flow rate difference (fully opened flow rate−closed position flow rate) obtained by deducting the closed position flow rate from the fully opened flow rate, and uses the atmospheric pressure, intake air temperature and engine water temperature to correct this flow rate difference (flow rate difference=(fully opened flow rate−closed position flow rate)−atmospheric pressure correction+intake air temperature correction+water temperature correction).

As an example method for determining these correction values, an atmospheric pressure correction table in which the relationship between atmospheric pressure and an atmospheric pressure-based correction value (atmospheric pressure correction) is indicated, an intake air temperature correction table in which the relationship between intake air temperature and an intake air temperature-based correction value (intake air temperature correction) is indicated, and a water temperature correction table in which the relationship between water temperature and a water temperature-based correction value (water temperature correction) is indicated are pre-stored in the memory 15 of the control computer 16, and these correction values are determined when a failure judgment is executed on the basis of these correction tables and sensor (atmospheric pressure sensor 65, intake air temperature sensor and water temperature sensor 27) detected values.

While a correction of the flow rate difference (fully opened flow rate−closed position flow rate) is performed in this embodiment on the basis of the atmospheric pressure, intake air temperature and the engine water temperature, there are no particular limitations thereto, and the correction need not be performed. For example, an invalid calibration value 0 may be entered in the correction term (correction table) and the correction omitted.

Next, the control computer 16 determines a predetermined judgment threshold value on the basis of the engine revolution number. In this embodiment the threshold value is set so as to be greater the higher the engine revolution number. For example, the control computer 16 pre-stores a table of judgment threshold values correspondent to engine revolution number in the memory 15, and when executing the failure judgment determines a judgment threshold value from a detected value of the engine revolution number sensor 28 and this table. However, this is not limited thereto, and a uniform threshold value unrelated to engine revolution number may be used.

Next, the control computer 16 compares the determined judgment threshold value with the calculated/corrected flow rate difference.

If the flow rate difference is less than the judgment threshold value in Step S6, in Step S7, the control computer 16 judges that mechanical failure of the exhaust throttle valve 12 has occurred due to sticking or the like. In other words, irrespective of the actuator 42 of the exhaust throttle valve 12 having been instructed to switch from full opening to the closed position, when the change in air flow rate is small, the exhaust throttle valve 12 is judged as having mechanically failed due to sticking.

Subsequent to the completion of Step S7, or when the flow rate difference of Step S6 is equal to or greater than the judgment threshold value (normal), the control computer 16 stores this completed diagnosis in the memory 15, and then completes the diagnosis control and shifts to normal control. The information stored in the memory 15 to the effect that the diagnosis has been completed is employed as the test mode executing condition (6).

The detection of fully opened flow rate and closed position flow rate of Step S3 to Step S5 of FIG. 2 will be hereinafter described in detail with reference to FIG. 3.

Figure 3:
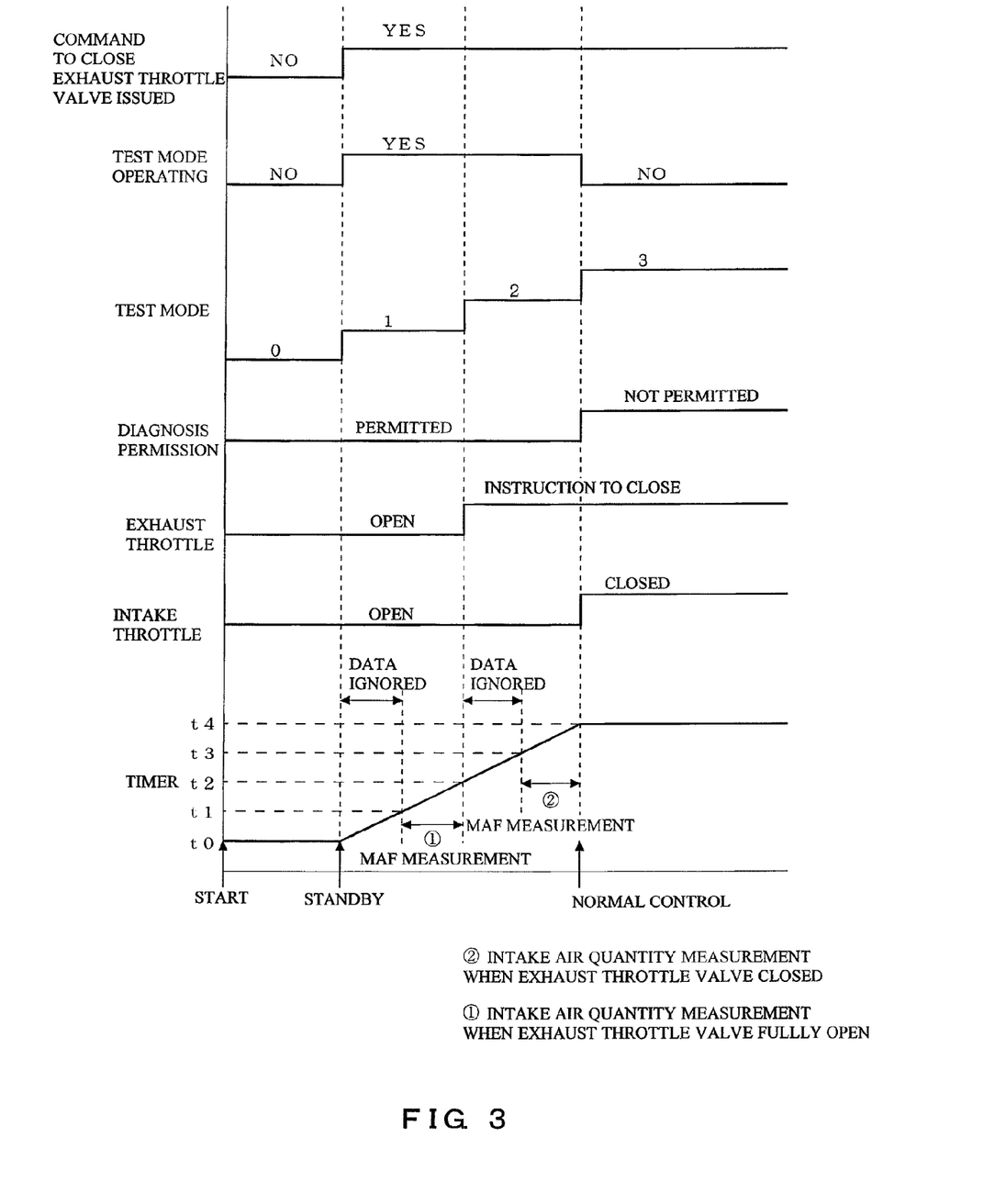
FIG. 3 is a diagram for explaining an exhaust throttle valve diagnosing method of this embodiment.

FIG. 3 shows in order from the top whether or not a command for closing the exhaust throttle valve 12 has been received by the control computer 16, whether or not the control computer 16 is executing the test mode, the test mode progress stage (0 denotes standby, 1 and 2 denote execution and 3 denotes completion), whether or not judgment permission (test mode executing conditions) has been established, the exhaust throttle valve 12 opening degree instruction, the intake throttle valve 4 opening degree, and the timer integrated values of the control computer 16.

First, the control computer 16 initiates the test mode and, in addition, initiates timer integration.

Next, in a test mode 1 (t0<timer integrated value≦t2), the control computer 16 issues an instruction for actuation with the exhaust throttle valve 12 fully opened to be stopped.

It executes the following additional processings (a) to (d) (Step S4).

(a) Fixes the opening degree of the EGR valve 8 to 0% establishing the full closing thereof.

(b) Fixes the opening degree of the intake throttle valve 4 to 0% establishing the full opening thereof.

(c) Fixes the opening degree of the VNT valve 9 to 10% establishing the essentially full opening thereof.

(d) Executes a measurement of air flow rate (exhaust gas flow rate) MAF values via the MAF sensor 14 for exhaust throttle valve mechanical sticking diagnosis.

Furthermore, it averages the air flow rate (exhaust gas flow rate) MAF values obtained in the processing (d) to determine the fully opened flow rate (hereinafter referred to as the fully opened flow rate average MAF value).

This fully opened flow rate average MAF value is calculated by implementation of an average processing based on multiplication of the air flow rate measured by the MAF sensor 14 per unit time with the intake quantity of each cylinder. The unit of measurement of the fully opened flow rate average MAF value is mg/cyl.

Here, because the flow rates (measured value of the MAF sensor 14) in a fixed time period (t0<timer integrated value≦t1) immediately following the valves 4, 8, 9 and 12 being fixed to full opening, to full closing or to the closed position are unstable due to pulsation and so on, the values measured during the period until these flow rates stabilize are not employed in the averaging processing and the data thereof is discarded.

In other words, the fully opened flow rate average MAF value is an average value of the air flow rate MAF values sampled between t1 and t2. More specifically, taking each MAF value sampled between t1 and t2 as a current MAF value i . . . current MAF value i−n, the fully opened flow rate average MAF value is determined as a fully opened flow rate average MAF value=(current MAF value i+current MAF value i−1+current MAF value i−3+current MAF value i−n)÷(t2−t1+sampling interval).

Next, in a test mode 2 (t2<timer integrated value≦t4), the control computer 16 issues an instruction to the actuator 42 for the exhaust throttle valve 12 to be closed and fixed to a predetermined closed position, and re-executes the processings (a) to (d) described above (Step S5).

Furthermore, in the same way used to obtain the fully opened flow rate average MAF value described above, it averages the air flow rate (exhaust gas flow rate) MAF values obtained in the processing (d) to determine a closed position flow rate (hereinafter referred to as the closed position flow rate average MAF value).

That is to say, this closed position flow rate average MAF value is calculated by implementation of an average processing based on multiplication of the air flow rate measured by the MAF sensor 14 per unit time with the intake quantity of each cylinder. The unit of measurement of the closed position flow rate average MAF value is mg/cyl.

In addition, in the same way as used to obtain the fully opened flow rate average MAF value, the calculation of this closed position flow rate average MAF value is based on implementation of a measured average processing of sampled air flow rate (exhaust gas flow rate) MAF values between t3 and t4.

In a test mode 3 (t4<timer integrated value), the test mode is completed and the control computer 16 returns to normal control.

More specifically, the control computer 16 returns to normal warm-up control (QWS control), and shifts to a normal target value control for controlling the opening degree of the intake throttle valve 4, the opening degree of the EGR valve 8 and the opening degree of the VNT valve 9 for which there are fixed control values.

As is described above, according to the diagnosis method of the diagnosis device pertaining to this embodiment, mechanical actuation defects (valve sticking or the like) of the exhaust throttle valve 12 for which diagnosis using conventional electrical diagnosis methods has been hitherto impossible can be easily judged and diagnosed.

As a result, actuation of the warm-up control (QWS control) and DPD regeneration control can be stopped when valve failure occurs.

In addition thereto, because the diagnosis of the exhaust throttle valve 12 is implemented with the intake throttle valve 4, EGR valve 8 and VNT valve 9 in a fixed state, when failure of the exhaust throttle valve 12 occurs the failed component part can be specified and a post-facto inspection promptly carried out.

Another embodiment will be hereinafter described with reference to FIG. 2.

While this embodiment is different to the embodiment described above with respect to the diagnosis of the exhaust throttle valve being implemented when a DPD regeneration control is executed with the vehicle stationary, in all other points it is the same.

In this embodiment, a judgment is made in Step S2 of FIG. 2 that the command for closing the exhaust throttle valve 12 is not a warm-up based command, and the diagnosis is implemented in Step S8 when a judgment is made that the command for closing the exhaust throttle valve 12 is a DPD regeneration control-based command. In other words, the diagnosis to regenerate the DPD device 13 is executed when the exhaust throttle valve 12 is switched to the closed position.

More specifically, in this embodiment, the test mode execution conditions (12), (13) of the embodiment described above are altered to the following conditions (12)' and (13)' respectively. In addition, a new test mode executing condition (14) is added.

Test mode executing conditions:
(12)' Warm-up control command OFF.
(13)' DPD regeneration control command ON.
(14) Engine revolution number stabilized. More specifically, the engine revolution number fluctuating amplitude during the air flow rate measurement period is not more than 150 rpm ($\leqq$150 rpm).

In addition thereto, an opening-side numerical value larger than used in the embodiment described above is established as the threshold value of the intake throttle valve 4 of the test mode executing condition (8). This is to ensure the diagnosis can also be implemented when regeneration is to be continued with the vehicle stationary following regeneration implemented when the vehicle is in motion.

In addition, in Step S3 to Step S5 of this embodiment in which the test mode for determining the fully opened flow rate and closed position flow rate are executed, a post/pilot injection and so on for raising the exhaust temperature is stopped and, for example, a fuel injection control the same as executed in the embodiment described above is executed.

An identical effect to that obtained in the embodiment described above is obtained using this embodiment.

The present invention is not limited to these two embodiments, and various modified examples and application examples thereof may be considered.

For example, while an MAF sensor is used as gas flow rate detection means in the embodiments described above, the present invention is not limited thereto. The position in which the flow rate sensor is provided is not limited to the intake passage and it may be provided in the exhaust passage and, in addition, indirect detection of flow rate while the flow rate is being calculated using a pressure sensor provided in the intake passage or exhaust passage may also be considered.

In addition, while an engine in which exhaust braking, warm-up acceleration and DPD regeneration is performed using a single exhaust throttle valve serves as the target of the embodiment described above, an engine comprising a plurality of exhaust throttle valves may serve as the target thereof. In this case, each exhaust throttle valve is diagnosed, the other exhaust throttle valves being preferably fixed to full opening during this diagnosis.

In addition, the position of the exhaust throttle valve is not limited to the downstream side of the DPD device and, for example, it may be disposed in the exhaust passage between the turbine and the DPD device.

What is claimed is:

1. An exhaust throttle valve diagnosing device for diagnosing mechanical failure of an exhaust throttle valve, which is provided with an intake throttle valve provided in an intake passage of an engine, the intake passage communicating with an exhaust passage of the engine through a recirculation passage of an exhaust recirculation device, and which is provided with a recirculation valve provided in the recirculation passage, and a turbocharger turbine having a variable turbo-vane and a normally fully opened exhaust throttle valve switchable to a predetermined close position provided in the exhaust passage downstream of the recirculation passage, comprising:

engine revolution number detection means for detecting a revolution number of the engine;

gas flow rate detection means for detecting a flow rate of a gas flowing through the intake passage or exhaust passage;

storage means for storing a flow rate detected by gas flow rate detection means; and failure judgment means for, when switching the exhaust throttle valve from full opening to the closed position in order to warm up the engine, fixing the intake throttle valve to full opening, fixing the recirculation valve to full closing and fixing the variable turbo-vane to a predetermined opening degree so as to accelerate a gas flow rate from the intake passage to the exhaust passage, detecting a fully opened flow rate by the gas flow rate detection means, with the exhaust throttle valve at full opening, and storing this flow rate in the storage means, and then instructing the exhaust throttle valve to switch from full opening to the closed position for detecting a closed position flow rate by the gas flow rate detection means, and determining a judgment threshold value corresponding to the detected revolution number of the engine, wherein the judgment threshold value increases as the revolution number of the engine increases, determining a flow rate difference by deducting the detected closed position flow rate from a fully opened flow rate stored in the storage means, and judging a failure of the exhaust throttle valve when this flow rate difference is less than the determined judgment threshold value.

2. The exhaust throttle valve diagnosing device as claimed in claim 1, wherein the gas flow rate detection means is configured from an intake air quantity sensor provided in the intake passage upstream from the intake throttle.

3. The exhaust throttle valve diagnosing device as claimed in claim 1, wherein the predetermined opening degree of the variable turbo-vane is not more than 10%.

4. The exhaust throttle valve diagnosing device as claimed in claim 1, wherein the flow rate difference is corrected in accordance with atmospheric pressure, intake air temperature, and engine water temperature.

5. An exhaust throttle valve diagnosing device for diagnosing mechanical failure of an exhaust throttle valve, which is provided with an intake throttle valve provided in an intake passage of an engine, the intake passage communicating with an exhaust passage of the engine through a recirculation passage of an exhaust recirculation device, and which is provided with a recirculation valve provided in the recirculation passage, and a turbocharger turbine having a variable turbo-vane, an exhaust purifying filter device for collecting exhaust particulates, and a normally fully opened exhaust throttle valve switchable to a predetermined close position provided in the exhaust passage downstream of the recirculation passage, comprising:
    engine revolution number detection means for detecting a revolution number of the engine;
    gas flow rate detection means for detecting a flow rate of a gas flowing through the intake passage or exhaust passage;
    storage means for storing a flow rate detected by gas flow rate detection means; and
    failure judgment means for, when switching the exhaust throttle valve from full opening to the closed position in order to regenerate the exhaust purifying filter device, fixing the intake throttle valve to full opening, fixing the recirculation valve to full closing and fixing the variable turbo-vane to a predetermined opening degree so as to accelerate a gas flow rate from the intake passage to the exhaust passage, detecting a fully opened flow rate by the gas flow rate detection means, with the exhaust throttle valve at full opening, and storing this flow rate in the storage means, and then instructing the exhaust throttle valve to switch from full opening to the closed position for detecting a closed position flow rate by the gas flow rate detection means, and determining a judgment threshold value corresponding to the detected revolution number of the engine, wherein the judgment threshold value increases as the revolution number of the engine increases, determining a flow rate difference by deducting the detected closed position flow rate from a fully opened flow rate stored in the storage means, and judging a failure of the exhaust throttle valve when this flow rate difference is less than the determined judgment threshold value.

6. The exhaust throttle valve diagnosing device as claimed in claim 5, wherein the gas flow rate detection means is configured from an intake air quantity sensor provided in the intake passage upstream from the intake throttle.

7. The exhaust throttle valve diagnosing device as claimed in claim 5, wherein the predetermined opening degree of the variable turbo-vane is not more than 10%.

8. The exhaust throttle valve diagnosing device as claimed in claim 5, wherein the flow rate difference is corrected in accordance with atmospheric pressure, intake air temperature, and engine water temperature.

9. An exhaust throttle valve diagnosing method for diagnosing mechanical failure of an exhaust throttle valve, which is provided with an intake throttle valve provided in an intake passage of an engine, the intake passage communicating with an exhaust passage of the engine through a recirculation passage of an exhaust recirculation device, and which is provided with a recirculation valve provided in the recirculation passage, and a turbocharger turbine having a variable turbo-vane and a normally fully opened exhaust throttle valve switchable to a predetermined close position provided in the exhaust passage downstream of the recirculation passage, the method comprising the steps of:
    when switching the exhaust throttle valve from full opening to the closed position to warm up the engine, fixing the intake throttle valve to full opening, fixing the recirculation valve to full closing and fixing the variable turbo-vane to a predetermined opening degree so as to accelerate a gas flow rate from the intake passage to the exhaust passage; and
    detecting a fully opened flow rate gas flow in the intake throttle valve or the exhaust throttle valve, with the exhaust throttle valve at full opening, and storing this fully opened flow rate, and then instructing the exhaust throttle valve to switch from full opening to the closed position for detecting a closed position flow rate, and determining a judgment threshold value corresponding to the detected revolution number of the engine, wherein the judgment threshold value increases as the revolution number of the engine increases, determining a flow rate difference by deducting the detected closed position flow rate from a fully opened flow rate that is stored, and judging a failure of the exhaust throttle valve when this flow rate difference is less than the determined judgment threshold value.

10. An exhaust throttle valve diagnosing method for diagnosing mechanical failure of an exhaust throttle valve, which is provide with an intake throttle valve provided in an intake passage of an engine, the intake passage communicating with an exhaust passage of the engine through a recirculation passage of an exhaust recirculation device, and which is provided with a recirculation valve provided in the recirculation passage, and a turbocharger turbine having a variable turbo-vane, an exhaust purifying filter device for collecting exhaust particulates, and a normally fully opened exhaust throttle valve switchable to a predetermined close position provided in the exhaust passage downstream of the recirculation passage,
    the method comprising the steps of:
    when switching the exhaust throttle valve from full opening to the closed position in order to regenerate the exhaust purifying filter device, fixing the intake throttle valve to full opening, fixing the recirculation valve to full closing and fixing the variable turbo-vane to a predetermined opening degree so as to accelerate a gas flow rate from the intake passage to the exhaust passage; and
    detecting a fully opened flow rate gas flow in the intake throttle valve or the exhaust throttle valve, with the exhaust throttle valve at full opening, and storing this fully opened flow rate, and then instructing the exhaust throttle valve to switch from full opening to the closed position for detecting a closed position flow rate, and determining a judgment threshold value corresponding to the detected revolution number of the engine, wherein the judgment threshold value increases as the revolution number of the engine increases, determining a flow rate difference by deducting the detected closed position flow rate from a fully opened flow rate that is stored, and judging a failure of the exhaust throttle valve when this flow rate difference is less than the determined judgment threshold value.

* * * * *